(12) United States Patent
Rea et al.

(10) Patent No.: US 7,909,024 B2
(45) Date of Patent: Mar. 22, 2011

(54) HYDROCARBON FUEL VAPOUR FILTER SYSTEM

(75) Inventors: Natale Rea, Woodbridge (CA); David A. Eby, Dundee, MI (US); David J. Gabbey, Pinckney, MI (US); Scott Rier, Pinckney, MI (US); Danny Infusino, Kleinburg (CA)

(73) Assignee: Martinrea International Inc., Vaughan, Ontario (CA)

( * ) Notice: Subject to any disclaimer, the term of this patent is extended or adjusted under 35 U.S.C. 154(b) by 7 days.

(21) Appl. No.: 11/947,359

(22) Filed: Nov. 29, 2007

(65) Prior Publication Data
US 2009/0139496 A1 Jun. 4, 2009

(51) Int. Cl.
*F02M 37/20* (2006.01)
*F02M 33/02* (2006.01)

(52) U.S. Cl. ......... 123/520; 123/516; 123/518; 123/519
(58) Field of Classification Search .................. 123/516, 123/518, 519, 520
See application file for complete search history.

(56) References Cited

U.S. PATENT DOCUMENTS

| | | | |
|---|---|---|---|
| 3,802,403 A * | 4/1974 | Dewick et al. ................ 123/520 |
| 5,002,596 A | 3/1991 | Moskaitis et al. | |
| 5,024,687 A | 6/1991 | Waller | |
| 5,363,828 A * | 11/1994 | Yamashita et al. ............ 123/520 |
| 5,477,836 A * | 12/1995 | Hyodo et al. .................. 123/519 |
| 5,912,368 A | 6/1999 | Satarino et al. | |
| 6,098,601 A | 8/2000 | Reddy | |
| 6,237,574 B1 | 5/2001 | Jamrog et al. | |
| 6,905,536 B2 | 6/2005 | Wright | |
| 6,976,478 B2 | 12/2005 | Kato et al. | |
| 7,168,417 B2 | 1/2007 | Arruda et al. | |
| 7,311,089 B2 * | 12/2007 | Balsdon ........................ 123/520 |
| 7,331,334 B2 * | 2/2008 | Leone et al. .................. 123/516 |
| 7,438,059 B2 * | 10/2008 | Mills et al. .................... 123/519 |
| 7,469,684 B2 * | 12/2008 | Leone et al. .................. 123/518 |
| 7,743,752 B2 * | 6/2010 | Kerns et al. .................... 123/520 |
| 2002/0046735 A1 | 4/2002 | Lee | |
| 2005/0178368 A1 | 8/2005 | Donahue et al. | |
| 2006/0162704 A1 | 7/2006 | Hagler et al. | |
| 2006/0266338 A1 * | 11/2006 | Kashima et al. .............. 123/519 |
| 2007/0079814 A1 * | 4/2007 | Rado et al. .................... 123/518 |
| 2007/0113831 A1 * | 5/2007 | Hoke et al. .................... 123/519 |
| 2008/0047532 A1 * | 2/2008 | Hill ............................... 123/518 |

* cited by examiner

*Primary Examiner* — Stephen K Cronin
*Assistant Examiner* — David Hamaoui
(74) *Attorney, Agent, or Firm* — Dimock Stratton LLP; Alan Macek

(57) ABSTRACT

A hydrocarbon vapour filter system for capturing vapour released from a fuel tank. The system contains a vapour line in vapour-tight communication with the fuel tank, having a vapour capture segment for capturing fuel vapour, and in the preferred embodiment a purging stage releasing the fuel vapour. During engine operation captured fuel vapour can be released from the vapour capture line into air drawn into the engine intake manifold.

10 Claims, 10 Drawing Sheets

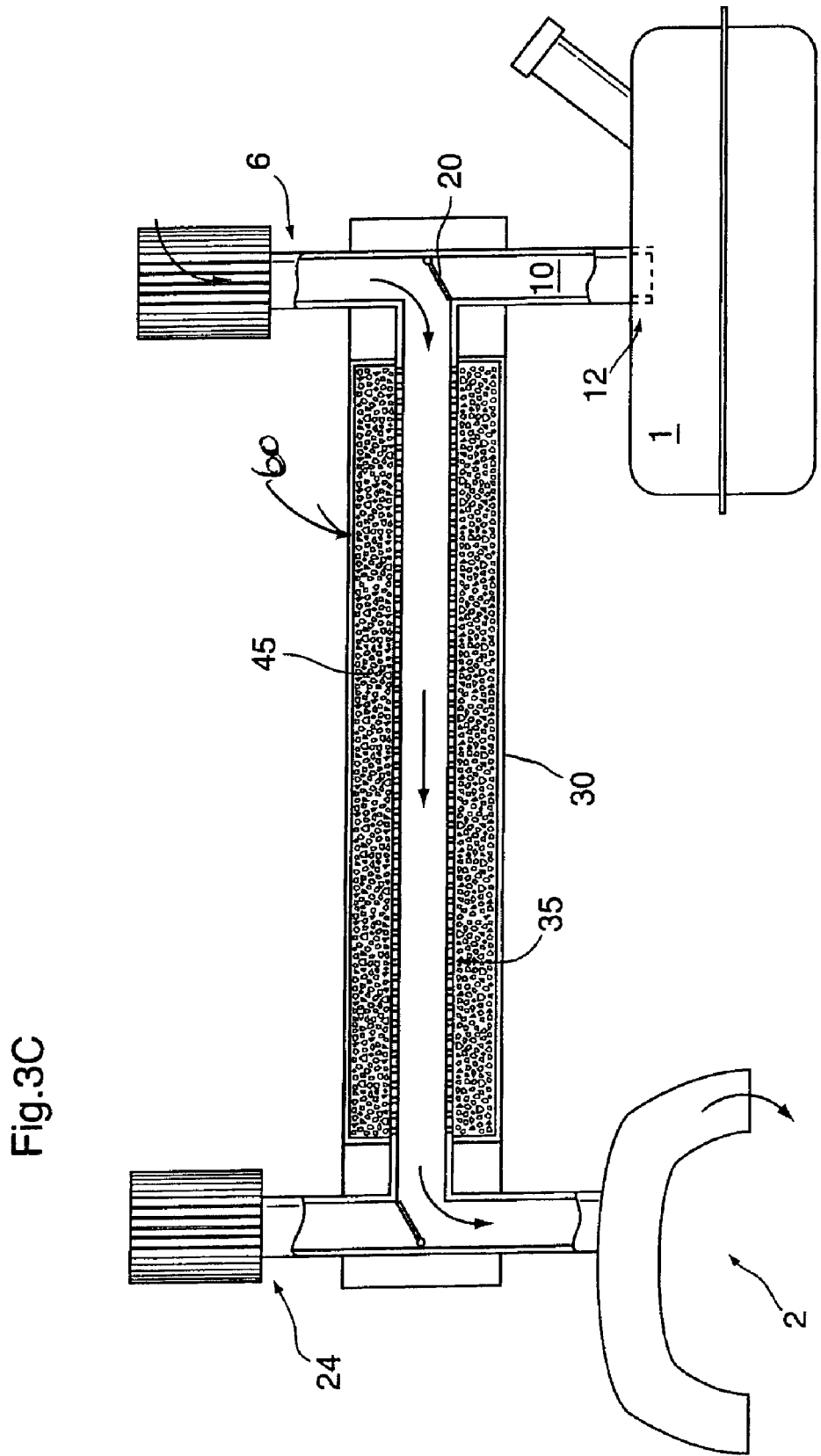

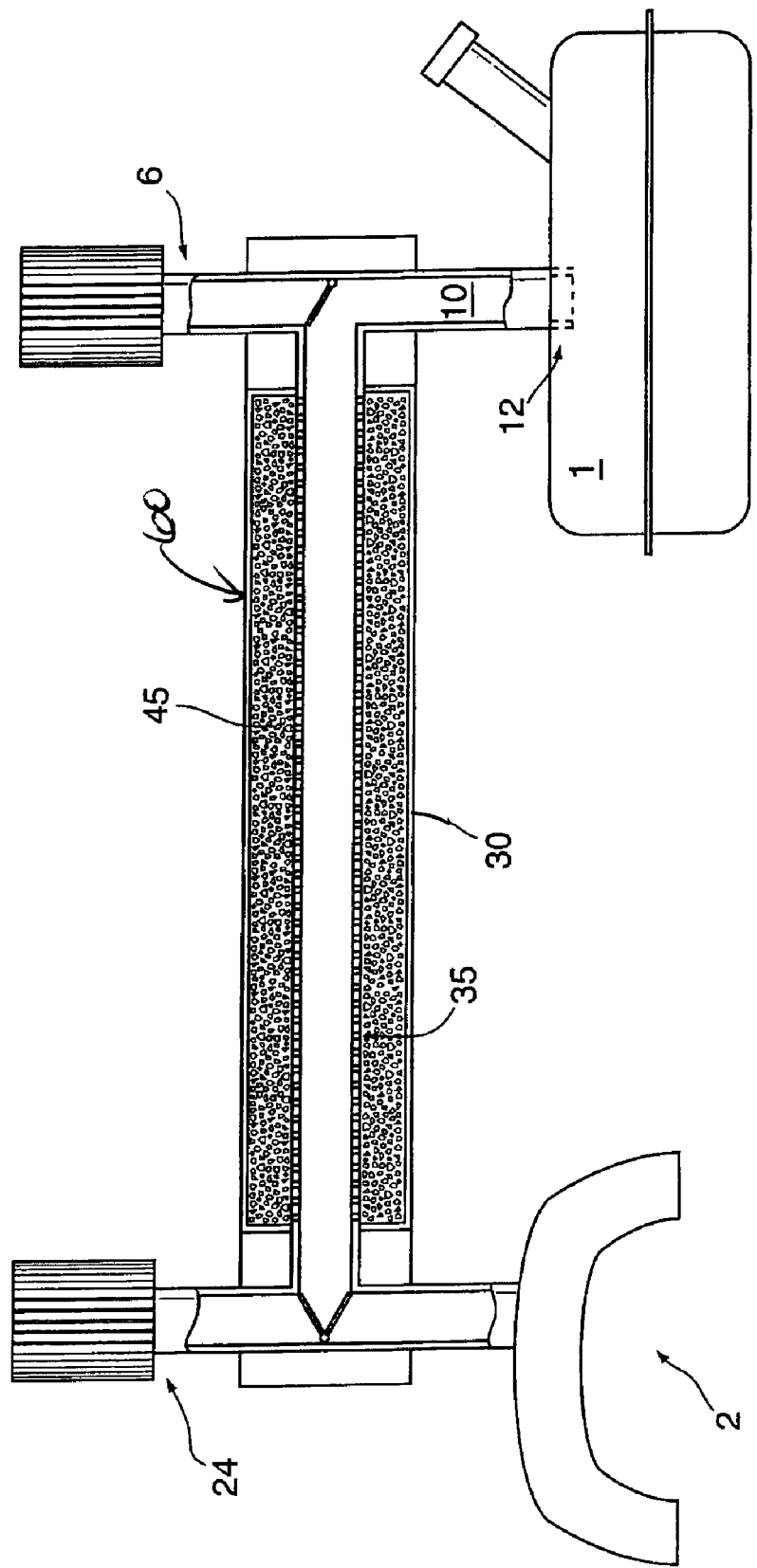

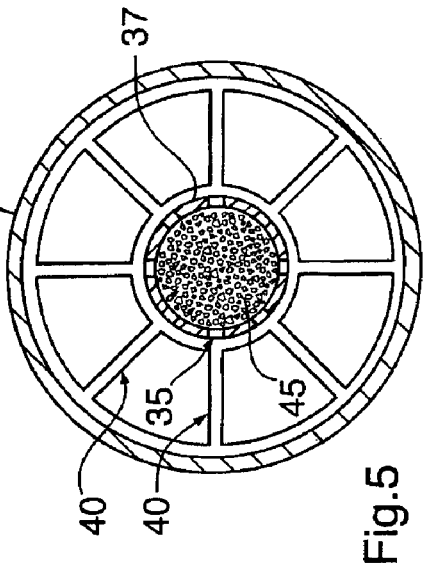
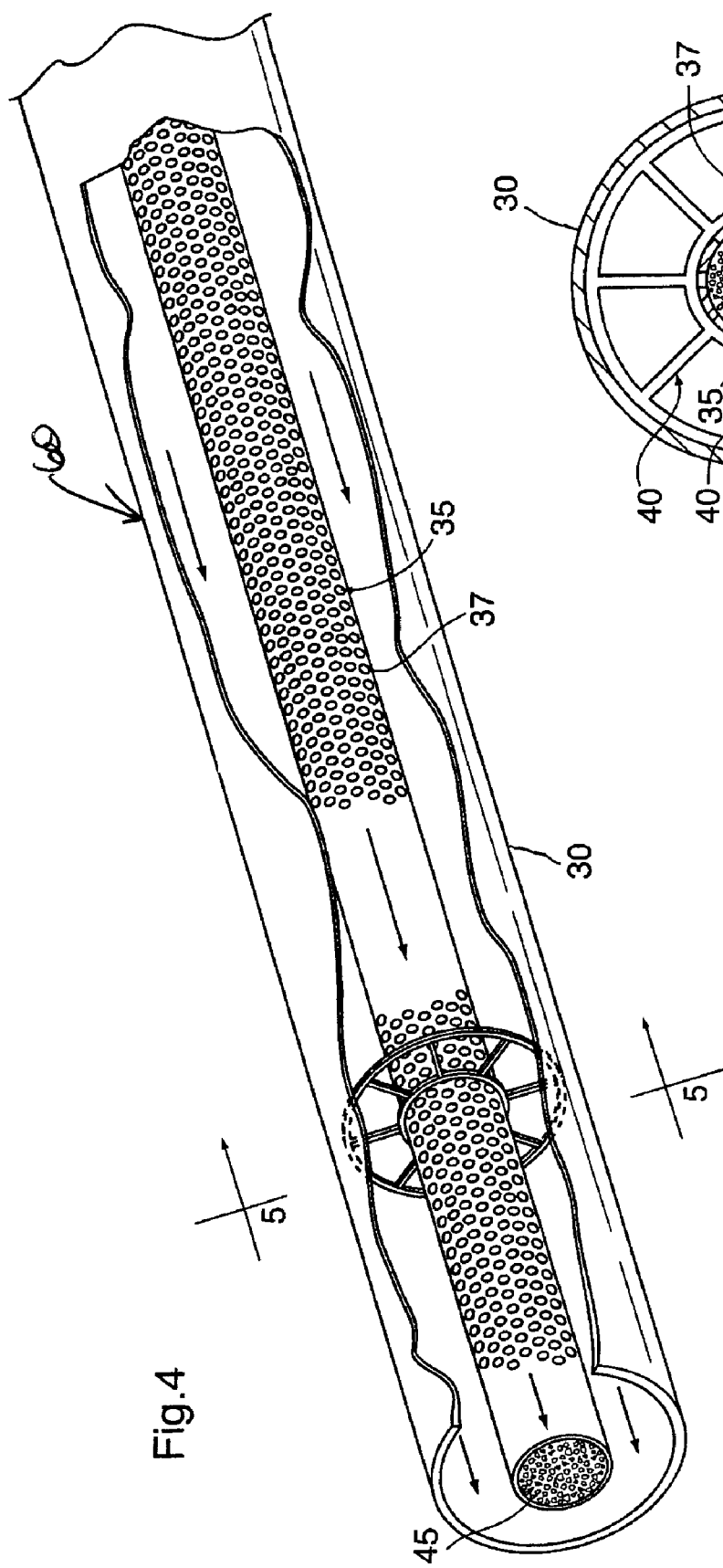

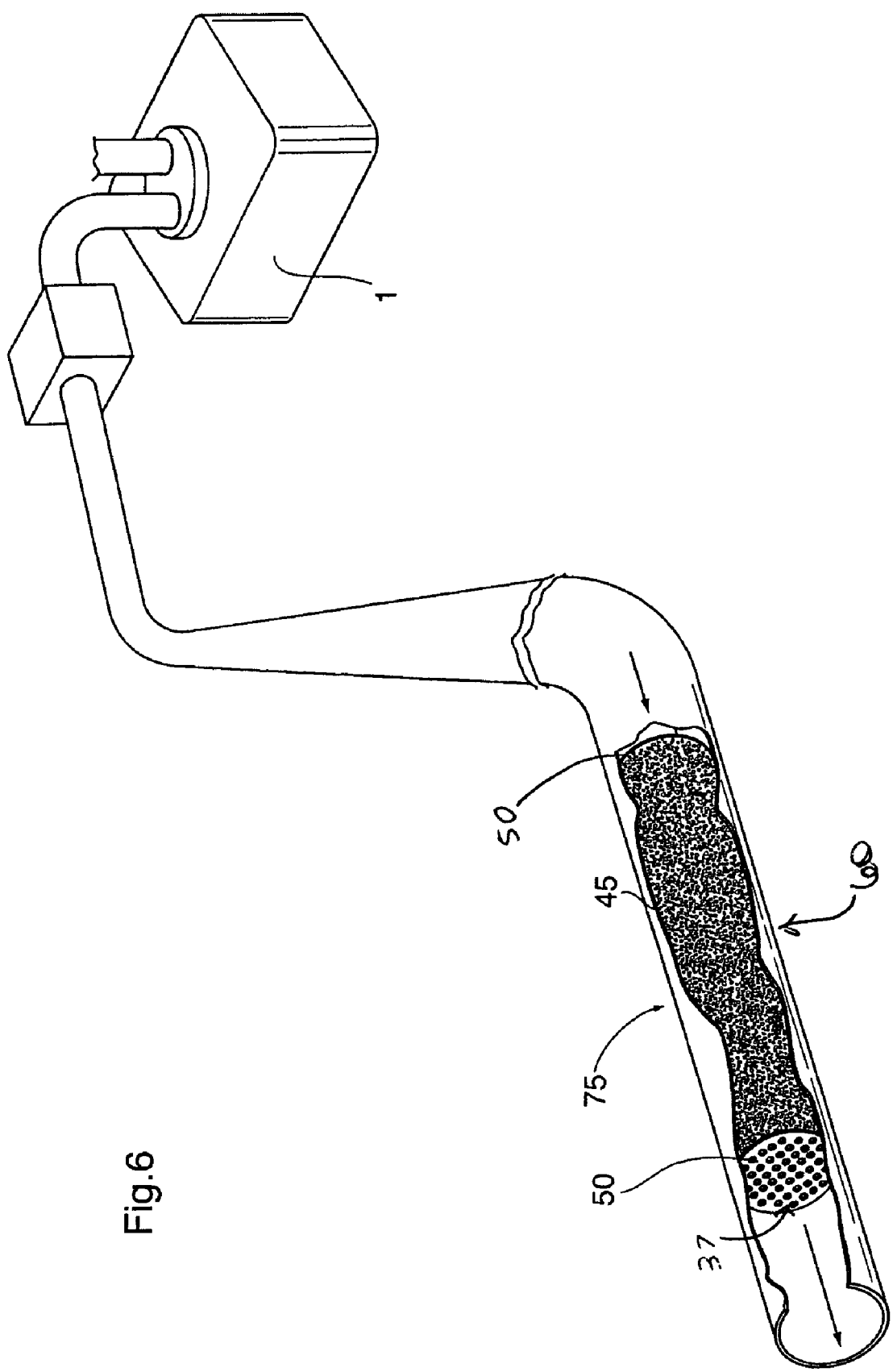

HYDROCARBON FUEL VAPOUR FILTER SYSTEM

FIELD OF THE INVENTION

This invention relates to a regenerating fuel vapour filtering system. In particular, the invention relates to a fuel vapour system for capturing hydrocarbon fuel vapour from a fuel tank.

BACKGROUND OF THE INVENTION

The systems known in art for capturing hydrocarbon fuel vapours that would otherwise be discharged to the atmosphere generally include a canister that processes the fuel vapours created in the fuel tank during refueling, heat expansion and other activities. The canister generally includes activated charcoal or similar material to adsorb and temporarily store the fuel vapour. After an interval of collecting fuel vapour in the canister, the fuel vapour is purged during a purging cycle by venting fresh air through the canister to the engine's intake manifold.

Such a prior art design is for example taught in U.S. Pat. No. 5,024,687 issued Jun. 18, 1991 to Waller for use in automobiles, which is incorporated herein by reference. The Waller design has a canister attached via a hose to the refuelling hose. When the engine is in operation, a purge flow control means is opened to allow a flow of air and fuel vapour to pass from the canister to the engine intake manifold.

The prior art design, as exemplified by Waller, requires a large external vapour canister, occupying space within the body of the vehicle. Such a design also requires separate vapour lines into and out of the vapour canister.

It is therefore desirable to have an apparatus that captures fuel vapour without requiring a bulky external canister with multiple vapour lines.

BRIEF DESCRIPTION OF THE DRAWINGS

In drawings which illustrate by way of example only a preferred embodiment of the invention.

FIGS. 3A to 3E are schematic side elevations of the embodiment of FIG. 1 showing the valve positions in various operating conditions.

FIG. 4 is a partially cutaway perspective view of a further embodiment of the fuel vapour filter according to the invention.

FIG. 5 is a cross-sectional view taken along line 5-5 of FIG. 4 showing the vapour filter of the further embodiment of the invention.

FIG. 6 is a cross-sectional perspective view of a still further embodiment of the vapour filter of the invention.

DETAILED DESCRIPTION OF THE INVENTION

The fuel vapour filtering system of the invention may be used with a fuel tank for an internal combustion engine and may be particularly advantageously used with a fuel tank for the internal combustion engine of vehicles such as an automobile. In a preferred embodiment, the system of the invention is regenerative. Automobiles typically have an advanced control system comprising a computer which includes an engine management system that controls many functions of the automobile. Such a control system can be readily adapted to operate a regenerating fuel vapour filtering system according to the invention. The invention may also be used in automobiles that do not have such a control system and in other applications and environments as well.

Figure 1:
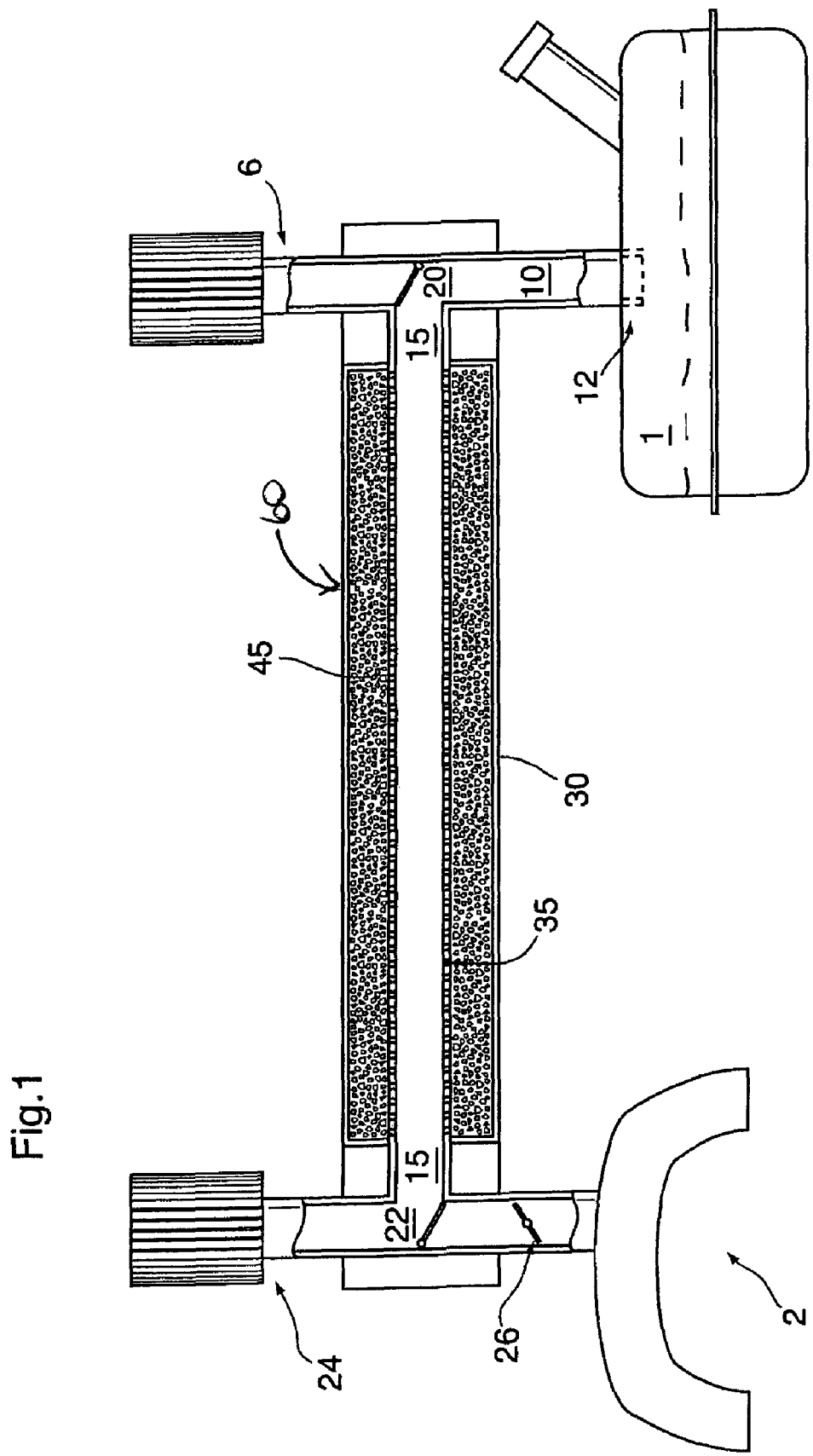
FIG. 1 is a schematic side elevation of a first embodiment of the invention as used in a vehicle fuel supply system.

Referring to FIG. 1, the fuel tank 1 is connected to the engine air intake manifold 2 via a fuel vapour line 10 provided with a vent valve 20, as is well known. The housing of the vent valve 20 receives the fuel vapour line 10 from the fuel tank 1. The vapour line 10 is in vapour-tight communication with the fuel tank 1 in a position to receive fuel vapour that has been generated within the fuel tank 1, for example through the top of the fuel tank 1. Preferably, a fuel tank vent valve 12 attached to the exterior surface of the fuel tank 1 connects the fuel tank 1 with the vapour line 10.

In a preferred embodiment of the invention, the vent valve 20 is interposed between the vapour line 10 and a vapour filter line 15 containing a vapour capture segment 60 as described more fully below. The vent valve 20 regulates the flow of vapour and air through the vapour line 10 and vapour filter line 15, controlled mechanically or by the automobile's engine management system. The vent valve 20 may also contain an air intake 6 external to the fuel tank 1 for a source of fresh air. The vapour line 10 and vapour filter line 15 are preferably formed from flexible plastic tubes suitable for containing fuel vapour, but any other suitable material may be used. The vapour filter line 15 may be a larger diameter than the vapour line 10 to provide sufficient room for the vapour-separating components described below.

In a preferred embodiment of the invention, a purge valve 22 is interposed between the vapour filter line 15 and the engine intake manifold 2. The purge valve 22 regulates the flow of air between the vapour filter line 15 and the engine intake manifold 2, alternatively diverting the air/fuel vapour mixture through a vent 24 to the atmosphere. The purge valve 22 is controlled by the engine management system.

In a preferred embodiment of the invention, the vapour filter line 15 connects the vent valve 20 to the engine intake manifold 2 via the purge valve 22. The vapour filter line 15 has a vapour capture segment 60 for capturing and releasing the fuel vapour.

The preferred embodiment may include a purge rate limiter 26 in the vapour line 10. The purge rate limiter controls the rate at which air and fuel vapour may flow into the engine intake manifold via the purge value 22. As the amount of air and fuel entering the engine is important to the operation of the engine, under some operating conditions, it may be preferred to control the rate the air and fuel vapour enters the engine. The purge rate limiter is preferably controlled by the engine management system. The function of the purge rate limiter may be integrated into the purge valve 22.

Figure 2:
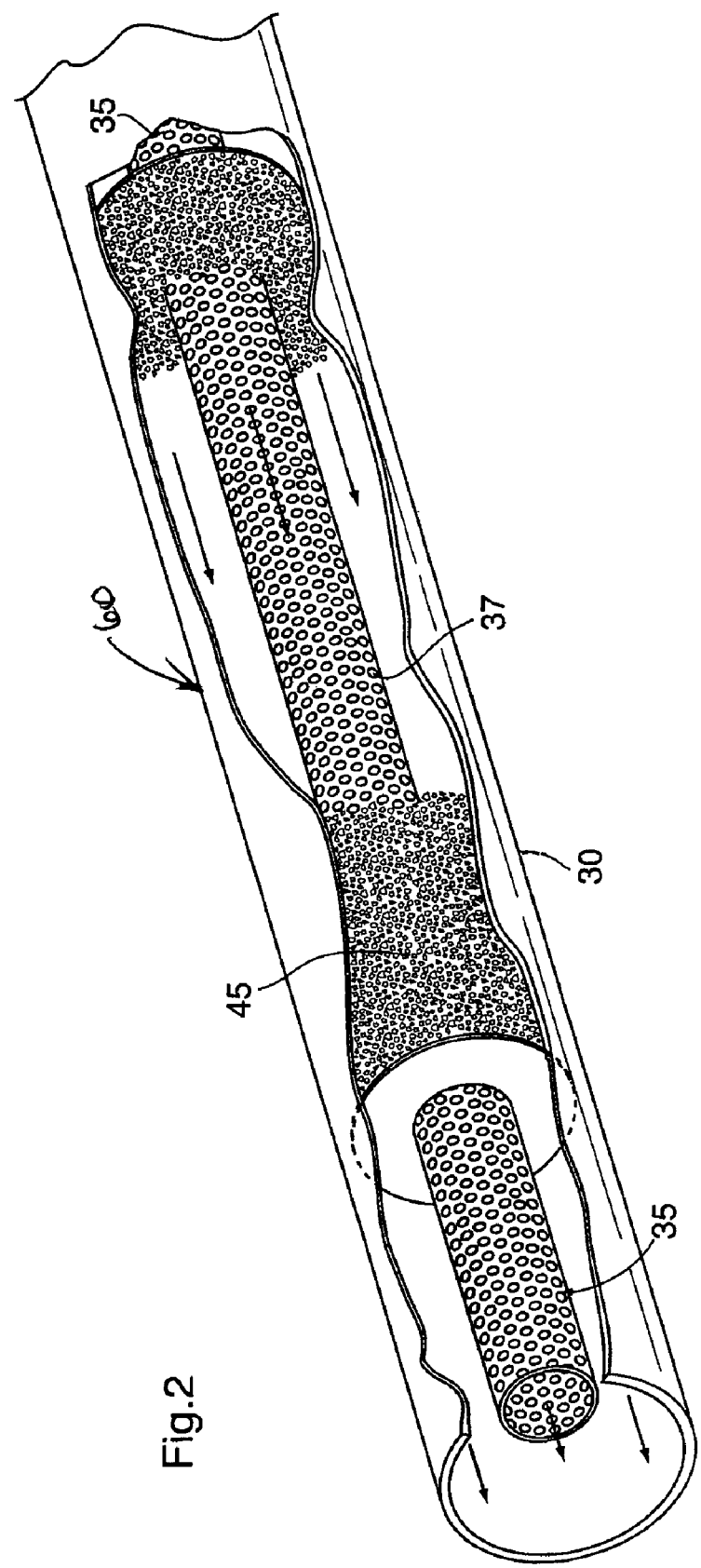
FIG. 2 is a partially cutaway perspective view of the vapour filter of FIG. 1.

In the embodiment illustrated in FIGS. 1 and 2 the vapour-capturing material 45 is contained within the outer conduit 30, and exposed to the fuel vapour as it passes from the fuel tank 1 through the outer conduit 30 through the holes 37. This provides a large, elongated surface area over which the vapour can be captured by the vapour-capturing material 45 as it flows from the fuel tank 1. The suction pressure of the intake manifold 2, the displacement by liquid fuel as the tank 1 is being refilled or the ambient temperature causing the liquid fuel in tank 1 to expand, displacing fuel vapour may cause the flow of vapour from the fuel tank 1.

Referring to FIG. 2, the vapour filter segment 60 contains an inner tube 35 which may be (but is not necessarily) coaxial with the vapour filter line 15 and is provided with a plurality of small openings, for example holes 37, which allow the passage of vapour but prevent the passage of the vapour-capturing material 45. In this embodiment the vapour-capturing material 45 fills an area within the outer conduit 30 surrounding inner tube 35. Air and fuel vapour flow through from the vapour filter line 15 outside of the inner tube 35 of the vapour capture segment 60. The holes 37 allow air and fuel vapour to pass from the volume inside of tube 35 to the vapour-capturing material 45 surrounding the inner tube 35. The vapour-capturing material 45 captures fuel vapour during the vapour capture mode, and in the vapour purge mode it releases vapour as will be described below. As will be appreciated, in all embodiments the inner tube 35 may be made permeable to the fuel vapour using openings other than small holes, such as slots or a membrane, the inner tube 35 serving to define a passage and separating the passage from the vapour-capturing material 45.

In the preferred embodiment the vent valve 20 and vapour purge valve 22 are three-way solenoid valves. The vent valve 20 allows selective communication between the fuel tank 1 and the vapour filter line 15 or between the air intake 6 and the vapour filter line 15. The vapour purge valve 22 allows selective communication between the vapour filter line 15 and the vent 24, or between the vapour filter line 15 and the engine intake manifold 2. In the preferred embodiment the purge valve 22 can also close off both the purge vent 24 and the engine intake manifold 2 from the vapour filter line 15, and the vent valve 22 can close off the air intake 6 for reasons described below.

In a vehicle using the preferred embodiment of FIG. 1, the operation of the invention can be described as having at least two modes: 1) the capture and storage of the fuel vapour and 2) the release of the fuel vapour. Other optional modes are described in detail below.

When the purge valve 22 is set to block the path from the vapour filter line 15 to the engine intake manifold 2, fuel vapour released by the fuel in the fuel tank 1 is filtered by the vapour filter line 15 embodying the invention. The vent valve 20 is in the quiescent position shown in FIG. 3A and allows an air and fuel vapour mixture to pass from the fuel tank 1 through the fuel tank vent valve 12, through the fuel vapour line 10 and vent valve 20, to the vapour capture segment 60. As indicated in FIG. 2, as the air and fuel vapour mixture passes through the vapour capture segment 60, the fuel vapour passes through the plurality of small holes 37 towards the outer tube 30, where it is exposed to and adsorbed by the vapour-capturing material 45.

In this way, the fuel vapour from the fuel tank 1 is captured by the vapour-capturing material 45 in the fuel vapour filter segment 60. The operation of the invention, in the vapour capture mode, is the same when the engine is running. The purge valve 22 allows the flow of air, after a portion of the fuel vapour is adsorbed by the vapour capture segment 60, to pass to the atmosphere through the fresh air outlet vent 24. Preferably most of the fuel vapour is adsorbed by the vapour capture segment before the flow of air passes to the atmosphere.

When the engine is operating and a fuel vapour purge cycle is initiated by the engine management system, the purge valve 22 opens such that the partial vacuum generated by normal operation of the engine, and manifest at the intake manifold 2, exerts a suction pressure on the fuel vapour filter line 15. The opening of the purge valve 22 is coordinated with the position of the vent valve 20 such that the vent valve 20 allows air to flow from a source outside the fuel tank into the fuel vapour filter line 15, for example via air intake 6. The flow of fresh air may be limited by the purge valve 22 to ensure that the flow of fresh air, and any fuel vapour it carries, does not substantially affect engine operation. The fresh air is drawn through the vapour filter line 15, and through the vapour capture segment 60 of the vapour filter line 15. In a preferred embodiment, the fresh air passing over the holes 37 draws the fuel vapour captured by the vapour-capturing material 45 out of the vapour-capturing material 45. The air containing the fuel vapour released from the vapour-capturing material 45 passes through the vapour capture line 15 to the engine intake manifold 2 to the engine. The engine burns the released vapour in conjunction with an adjusted fuel and air mixture as part of the normal combustion process.

Figure 3A:
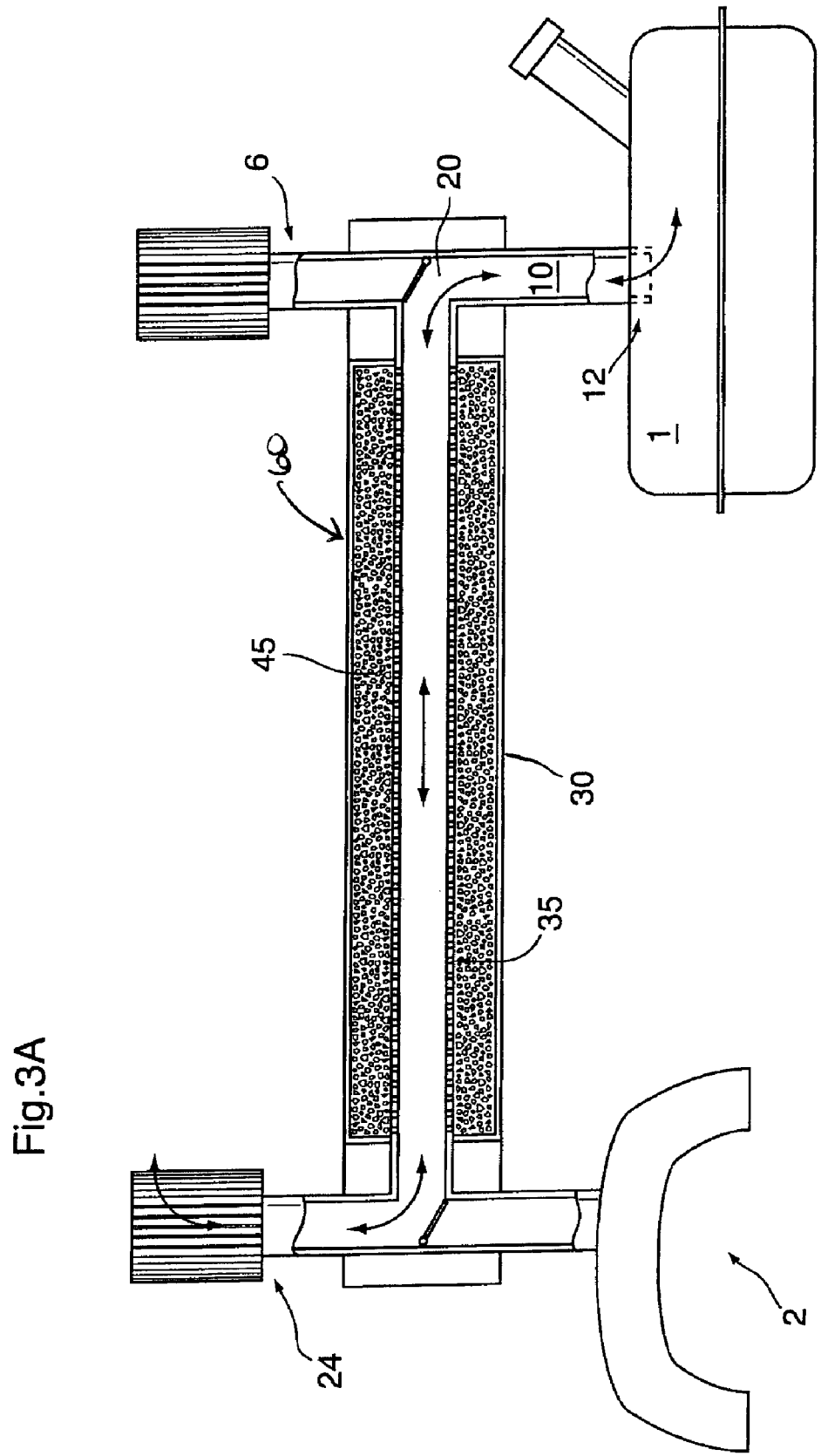

FIGS. 3A to 3E illustrate the positions of valves 20, 22 in various operating conditions of the embodiment illustrated in FIG. 1. FIG. 3A illustrates the flow of the fuel vapour mixture in a vapour-capturing mode, whether the automobile engine is off or on. The vent valve 20 and vapour purge valve 22 are in the positions shown (which may for example be the quiescent positions of the valves 20, 22, so that no current is required to retain the valves 20, 22 in this position). Fuel vapour may escape from the fuel tank 1 into the vapour filter line 15 as the temperature increases and the fuel vapourizes, where it disperses toward the outer tube 30 and is adsorbed by the vapour-capturing material 45 before being vented to the atmosphere through air filter 24. Alternatively, when the engine is running and fuel is being depleted, or as the temperature decreases and the fuel contracts, air is drawn in through air filter 24, through the vapour filter line 15 and into the fuel tank 1 to prevent excessive vacuum from forming in the fuel tank 1.

Figure 3B:
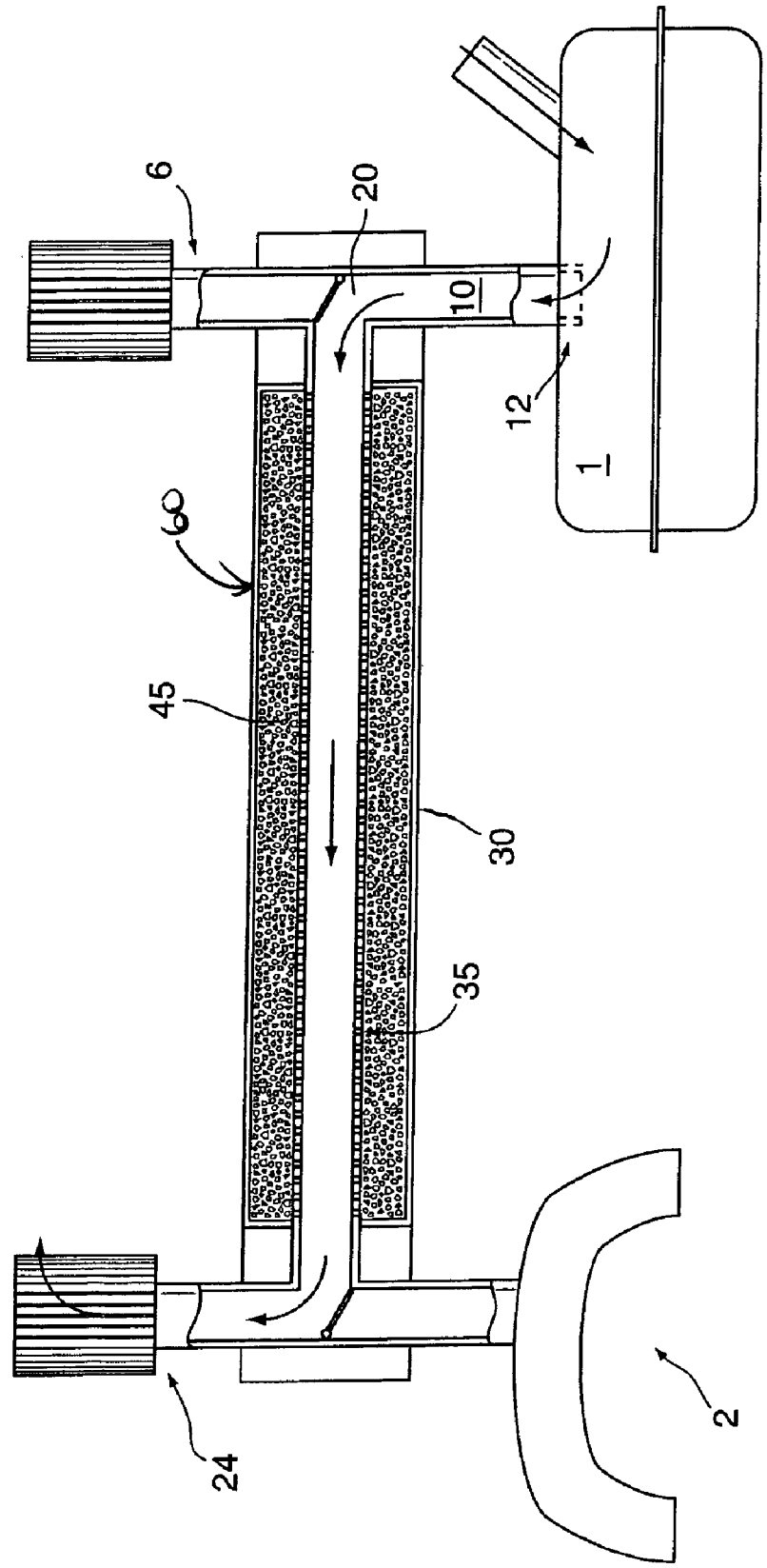

FIG. 3B shows the refueling condition, with the engine off and fuel (for example gasoline) being pumped into the fuel tank 1. As the level of liquid fuel rises, fuel vapour is displaced into the vapour filter line 15 where it disperses into the outer tube 30 and is adsorbed by the vapour-capturing material 45 before the air-fuel mixture, less the fuel vapour adsorbed by the vapour-capturing material 45, is vented to the atmosphere through air filter 24.

FIG. 3C shows the positions of the valves 20, 22 in the vapour purge mode. The air outlet 24 is closed off by purge valve 22 and the fuel tank 1 is closed off by vent valve 20, so the suction created by the engine intake manifold 2 draws air in through air intake 6, and through the vapour filter line 15. The fresh air contacts the vapour-capturing material 45, which in the case of activated charcoal releases adsorbed fuel vapour into the fresh air flow. The released fuel vapour is entrained in the air flow and purged through purge valve 22 and into the engine manifold 2.

Figure 3D:
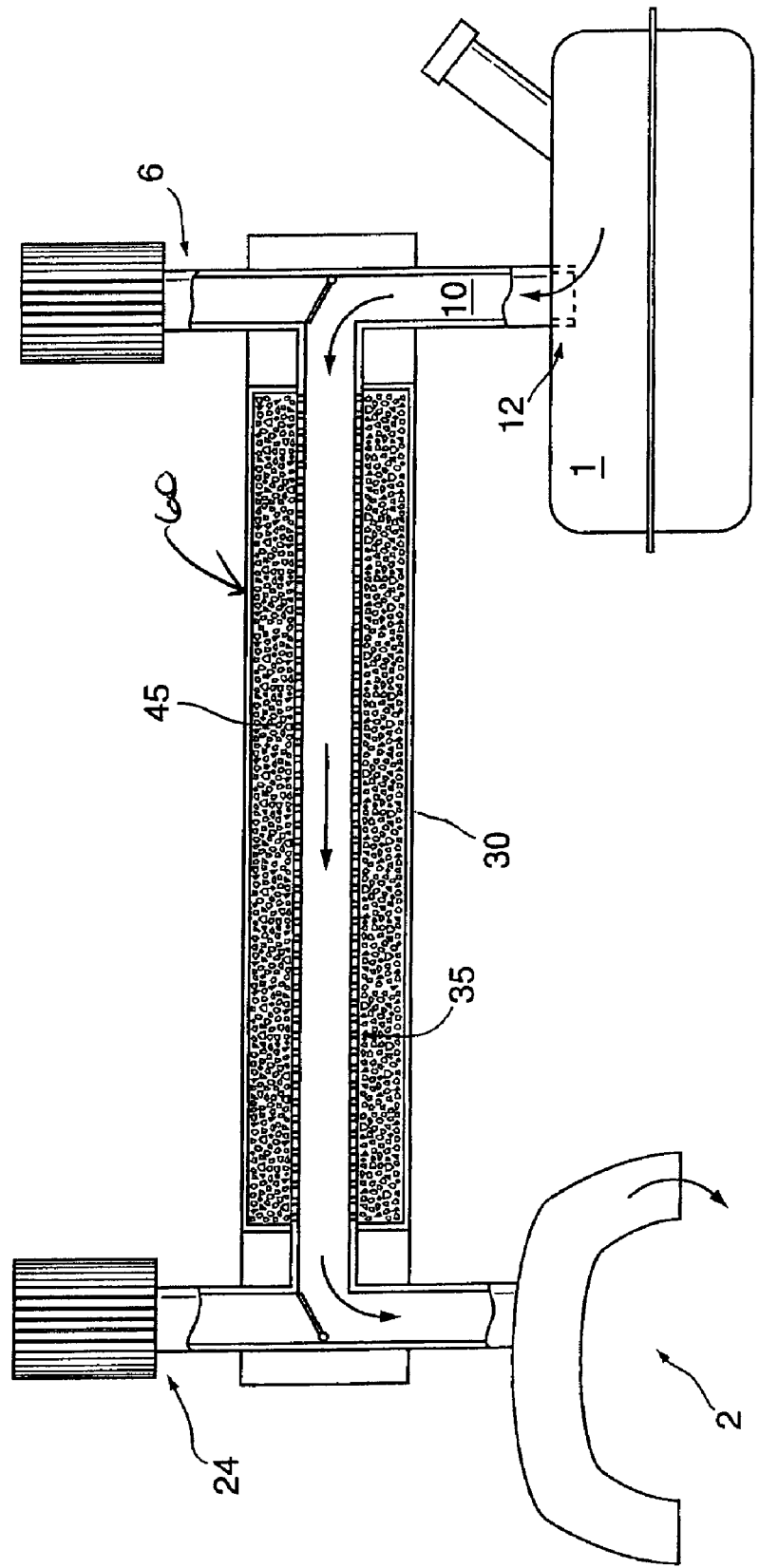

FIGS. 3D and 3E shows the positions of the valves 20, 22 in an optional leak test mode. In FIG. 3D, both air intake 6 and vapour purge outlet 24 are closed off, so when the engine is running the partial vacuum at intake manifold 2 creates a negative pressure condition (relative to the ambient air pressure) within the fuel tank 1, fuel vapour line 10 and the vapour filter line 15, in preparation for a leak test. When a suitable negative pressure has been generated the purge valve 22 is switched to the condition shown in FIG. 3E, which also closes off the engine from the fuel vapour line 10. The rate of decay of the negative pressure can then be measured to determine the overall leak rate of the system to air and vapour.

FIGS. 4, 5 and 6 show alternative embodiments of the vapour filter segment.

As shown in FIGS. 4 and 5, in a second embodiment the vapour capture segment 60 of the vapour filter line 15 contains an inner tube 35 which may be (but is not necessarily) positioned coaxially with an outer vapour-impermeable conduit 30. Vapour-capturing material 45 is contained within the inner tube 35. The inner tube 35 is provided with a plurality of small openings, for example holes 37, which allow fuel vapour and fresh air to pass between the outer conduit 30 and the inner tube 35 but do not allow the vapour-capturing material 45 to pass through. The inner tube 35 is preferably positioned within the vapour filter line 15 using spacers 40 which may be made of a suitable plastic able to withstand the fuel vapour such as high density polyethylene.

The inner tube 35 contains a hydrocarbon vapour-capturing material 45, in the preferred embodiment suitable for adsorbing and releasing fuel vapour, which typically may be a carbon material such as activated charcoal. Such vapour-capturing material 45 is well known in the art. Generally, when a high concentration of fuel vapour comes into contact with the vapour-capturing material 45, the fuel vapour is adsorbed and thereby captured by the vapour-capturing material 45. In the case of activated charcoal the vapour-capturing material may be regenerated by bringing substantially fuel vapour-free air into contact with the carbon material, which then releases adsorbed fuel vapour to the passing air, and the fuel vapour-laden air can be directed into the engine manifold 2. If activated carbon is used, it may take the form of pellets, cloth or an extruded matrix.

Another alternative embodiment of a vapour capture segment 60 is shown in FIG. 6. Two separator discs, for example caps 50 having a plurality of openings, for example small holes 37, which allow the passage of vapour but prevent the passage of the vapour-capturing material 45, are positioned generally transverse to the vapour filter line 75 and within vapour filter line 75 a selected distance apart. Vapour-capturing material 45 is disposed between the caps 50 inside the vapour filter line 75. The distance between the caps 50 may be determined by the amount of vapour-capturing material desired to capture the fuel vapour. The caps 50 contain the vapour-capturing material 45 within the vapour filter segment 70 of the vapour filter line 75 yet allowing fuel vapour and air to pass through the vapour filter line 75 by passing through the upstream cap 50, through the vapour-capturing material 45 and through the downstream cap 50 to the purge valve.

In an alternative embodiment, the fuel tank 1 is connected to an air intake 24 via a fuel vapour filter line 15. In this alternative embodiment, the fuel vapour filter line is not connected with the engine intake manifold. The vapour filter line 15 is in vapour-tight communication with the fuel tank 1 in a position to receive fuel vapour that has been generated within the fuel tank 1. The vapour filter line 15 contains a vapour capture segment 60 as described above. Fuel vapour released by the fuel in the fuel tank 1 is filtered by the vapour filter line 15. The fuel vapour mixture from the fuel tank is allowed to pass from the fuel tank 1 through the fuel vapour filter line 15 and to the vapour capture segment 60. As the air and fuel vapour mixture passes through the vapour capture segment 60, it is adsorbed by the vapour-capturing material 45 as described earlier. During engine operation and fuel in the fuel tank 1 is consumed, or when temperature in the fuel tank 1 is reduced, air from a source outside the fuel tank is allowed to flow in to the air intake 24 and through the fuel vapour filter line 15. As described earlier, the fresh air draws the fuel vapour captured by the vapour capturing material 45 out of the vapour capturing material 45. The air containing the fuel vapour released from the vapour-capturing material 45 passes through the vapour filter line 15 to the fuel tank 1.

Figure 7:
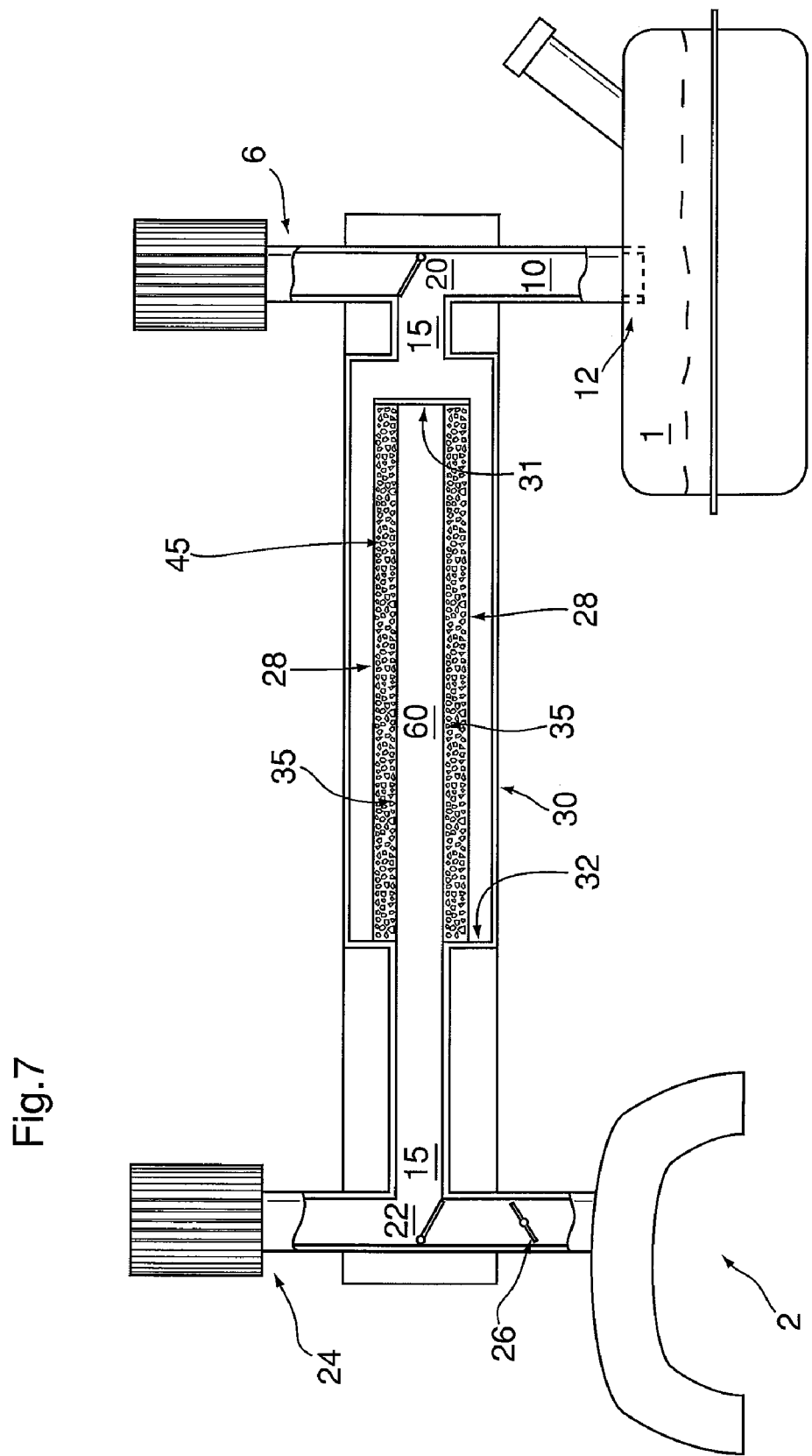
FIG. 7 is a schematic side elevation of a further embodiment of a fuel vapour filter of the invention.

A further alternative embodiment of the vapour capture segment 60 is shown in FIG. 7. In this embodiment, the vapour filter line 15 contains an inner tube 35 which may be (but is not necessarily) positioned coaxially with an outer vapour-impermeable conduit 30. A separator tube 28 is positioned between the inner tube 35 and the outer conduit 30. A vapour impermeable first end cap 31 forms a barrier at the first end of the inner tube 35 and the separator tube 28. A vapour impermeable second end cap 32 forms a barrier at the second end of the outer conduit 30 and the separator tube 28 but contains a passage for the flow of fuel vapour from the inner tube 35. Vapour-capturing material 45 is contained within the space between the separator tube 28, the inner tube 35 and the first and second end caps 31 and 32. The inner tube 35 and the separator tube 28 is provided with a plurality of small opening, for examples holes, which allow fuel vapour and fresh air to pass through the separator tube 28 and the inner tube 35 to the vapour-capturing material. At the first end, fuel vapour passes from the vapour filter line 15 to the space between the outer conduit 30 and the separator tube 28. At the second end, fuel vapour may pass from inner tube 35 to the vapour filter line 15 and the purge value 22. In this way, vapour must pass through the vapour capturing material 45 as it flows from the first end to the second end of the vapour filter line 15.

Various embodiments of the present invention having been thus described in detail by way of example, it will be apparent to those skilled in the art that variations and modifications may be made without departing from the invention.

The invention claimed is:

1. A hydrocarbon vapour filter system for connection between a fuel tank and an intake manifold of a combustion engine, for filtering hydrocarbon vapour released from the fuel tank, comprising at least one vapour filter line of vapour-impermeable material in fluid communication through a vapour-tight connection with the fuel tank, comprising at least one vapour capture portion containing a hydrocarbon vapour capturing material for capturing hydrocarbon vapour having a first end in selective fluid communication through a vapour-tight connection with the fuel tank and an air inlet, and a second end in selective fluid communication through a vapour-tight connection with a vapour purge outlet and the intake manifold;

a vent valve for selectively closing off communication between the vapour filter line and the fuel tank or the air inlet, a vapour purge valve for selectively closing off communication between the vapour filter line and the intake manifold or vapour purge outlet, and a means of controlling the vent valve and vapour purge valve, whereby in a first mode at least some vapour flowing from the fuel tank through the vapour filter line is captured by the vapour capturing material, and in a second mode air drawn into the air inlet and through the vapour filter line releases at least some of the captured fuel vapour, regenerating the vapour capturing material.

2. The hydrocarbon vapour filter system of claim 1, where the hydrocarbon vapour capturing material for capturing hydrocarbon vapour comprises activated carbon.

3. The hydrocarbon vapour filter system of claim 2, where the activated carbon is in whole or in part formed in pellets.

4. The hydrocarbon vapour filter system of claim 2, where the activated carbon is in whole or in part in the form of a cloth.

5. The hydrocarbon vapour filter system of claim 2, where the activated carbon is formed in whole or in part as an extruded matrix.

6. The hydrocarbon vapour filter system of claim 2, where the vapour capture portion comprises a hydrocarbon vapour permeable separator tube substantially aligned and within the at least one vapour filter line of vapour-impermeable material and a hydrocarbon vapour permeable inner tube substantially aligned and within the separator tube, with the hydrocarbon vapour capturing material for capturing hydrocarbon vapour retained between the inner tube and the separator tube, one or more vapour impermeable barriers between the outer conduit vapour capture portion of the vapour filter line and separator tube to direct vapour passing through the vapour filter line to pass through the vapour capturing material retained between the inner tube and the separator tube.

7. The hydrocarbon vapour filter system of claim 6, wherein the hydrocarbon vapour permeable inner tube and vapour permeable separator tube each comprise a tube penetrated by a plurality of small holes, whereby vapour may pass through the plurality small holes and the plurality of small holes are too small to allow the hydrocarbon capturing material to pass through the plurality of small holes.

8. The hydrocarbon vapour filter system of claim 2, further comprising a purge rate limiter imposed on the vapour filter line for limiting the rate of flow of fuel vapour supplied to the intake manifold.

9. The hydrocarbon vapour filter system of claim 1, where the vapour capture portion comprises a first hydrocarbon vapour permeable surface substantially aligned and within the at least one vapour filter line of vapour impermeable material and a second hydrocarbon vapour permeable surface substantially aligned and within the at least one vapour filter line of vapour impermeable material, with the hydrocarbon vapour capturing material for capturing hydrocarbon vapour retained between the first permeable surface and the second permeable surface, one or more vapour impermeable barriers between the vapour capture portion of the vapour filter line and the first and second permeable surfaces to direct vapour passing through the vapour filter line to pass through the vapour capturing material retained between the first permeable surface and the second permeable surface.

10. The hydrocarbon vapour filter system of claim 9, wherein the first hydrocarbon vapour permeable surface and the second hydrocarbon vapour permeable surface each comprise a screen penetrated by a plurality of small holes, whereby vapour may pass through the plurality small holes and the plurality of small holes are too small to allow the hydrocarbon capturing material to pass through the plurality of small holes.

* * * * *